United States Patent
Haynes et al.

(10) Patent No.: US 9,695,940 B2
(45) Date of Patent: Jul. 4, 2017

(54) BIDIRECTIONAL LIFT-OFF CIRCUMFERENTIAL SHAFT SEAL SEGMENT AND A SHAFT SEAL INCLUDING A PLURALITY OF THE SEGMENTS

(71) Applicants: George Perry Haynes, Baltimore, MD (US); Jared Daniel Manry, Shrewsbury, PA (US)

(72) Inventors: George Perry Haynes, Baltimore, MD (US); Jared Daniel Manry, Shrewsbury, PA (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 0 days.

(21) Appl. No.: 14/132,571

(22) Filed: Dec. 18, 2013

(65) Prior Publication Data

US 2015/0167846 A1      Jun. 18, 2015

(51) Int. Cl.
| | |
|---|---|
| *F16J 15/34* | (2006.01) |
| *F16J 15/00* | (2006.01) |
| *F16J 15/40* | (2006.01) |
| *F16J 15/44* | (2006.01) |

(52) U.S. Cl.
CPC ............. *F16J 15/34* (2013.01); *F16J 15/40* (2013.01); *F16J 15/442* (2013.01)

(58) Field of Classification Search
CPC ......... F16J 15/34; F16J 15/3404; F16J 15/447
USPC ........................................ 277/399, 350, 416
See application file for complete search history.

(56) References Cited

U.S. PATENT DOCUMENTS

| | | | | |
|---|---|---|---|---|
| 2,867,458 | A | | 1/1959 | Kroekel |
| 3,575,424 | A | * | 4/1971 | Taschenberg ................. 277/411 |
| 3,640,541 | A | * | 2/1972 | Taschenberg ................. 277/400 |
| 4,082,296 | A | * | 4/1978 | Stein ............................ 277/400 |
| 4,145,058 | A | * | 3/1979 | Hady et al. .................. 277/366 |
| 4,546,985 | A | * | 10/1985 | Forch ........................... 277/560 |
| 4,733,873 | A | | 3/1988 | Takenaka et al. |
| 5,066,026 | A | * | 11/1991 | Heck et al. ................... 277/400 |
| 5,145,189 | A | * | 9/1992 | Pope ............................ 277/544 |
| 5,169,159 | A | * | 12/1992 | Pope et al. ................... 277/422 |

(Continued)

FOREIGN PATENT DOCUMENTS

| | | |
|---|---|---|
| EP | 0992723 A2 | 4/2000 |
| EP | 1988313 A1 | 11/2008 |

(Continued)

OTHER PUBLICATIONS

Brochure: Kaydon—Turning Ideas Into Engineering Solutions, Kaydon Ring and Seal, 1999, p. 2.

*Primary Examiner* — Kristina Fulton
*Assistant Examiner* — Eugene G Byrd
(74) *Attorney, Agent, or Firm* — Mark Ussai; SKF USA Inc. Patent Dept.

(57) ABSTRACT

A circumferential shaft seal segment includes a radial outer face, a radially inner face, a first axial face extending from the radial outer face to the radial inner face and a second axial face axially spaced from the first axial face and extending from the radially outer face to the radially inner face. The seal has a bleed slot in the radially inner face extending from the first axial face toward the second axial face, and there are first and second recesses in the radially inner face in communication with the bleed slot that extend from circumferentially opposite sides of the bleed slot.

17 Claims, 5 Drawing Sheets

(56) References Cited

U.S. PATENT DOCUMENTS

| | | | |
|---|---|---|---|
| 5,301,957 A * | 4/1994 | Hwang et al. | 277/350 |
| 5,509,664 A * | 4/1996 | Borkiewicz | 277/543 |
| 5,558,341 A * | 9/1996 | McNickle | F16J 15/3488 |
| | | | 277/400 |
| 6,145,842 A | 11/2000 | Zellers et al. | |
| 6,145,843 A | 11/2000 | Hwang | |
| 7,144,016 B2 | 12/2006 | Gozdawa | |
| 7,377,518 B2 | 5/2008 | Lai | |
| 7,432,620 B2 | 10/2008 | Freal et al. | |
| 7,540,501 B2 * | 6/2009 | Flaherty | 277/399 |
| 7,762,558 B2 | 7/2010 | Schoellhorn | |
| 7,770,895 B2 * | 8/2010 | Zheng et al. | 277/416 |
| 7,914,007 B2 | 3/2011 | Berard et al. | |
| 7,931,277 B2 * | 4/2011 | Garrison | 277/399 |
| 7,963,525 B1 | 6/2011 | Garrison | |
| 8,091,898 B2 | 1/2012 | Garrison | |
| 8,272,643 B2 | 9/2012 | Garrison et al. | |
| 8,408,556 B2 * | 4/2013 | Vasagar et al. | 277/399 |
| 8,905,407 B2 * | 12/2014 | Ruggeri et al. | 277/400 |
| 2008/0157479 A1 | 7/2008 | Vasagar et al. | |
| 2008/0272552 A1 | 11/2008 | Zheng et al. | |
| 2010/0164183 A1 | 7/2010 | Berard et al. | |
| 2014/0197675 A1 * | 7/2014 | Morman et al. | 301/105.1 |
| 2014/0325791 A1 * | 11/2014 | Colverson et al. | 16/2.2 |

FOREIGN PATENT DOCUMENTS

| | | |
|---|---|---|
| FR | 2352997 A1 | 12/1977 |
| GB | 2218475 A | 11/1989 |

\* cited by examiner

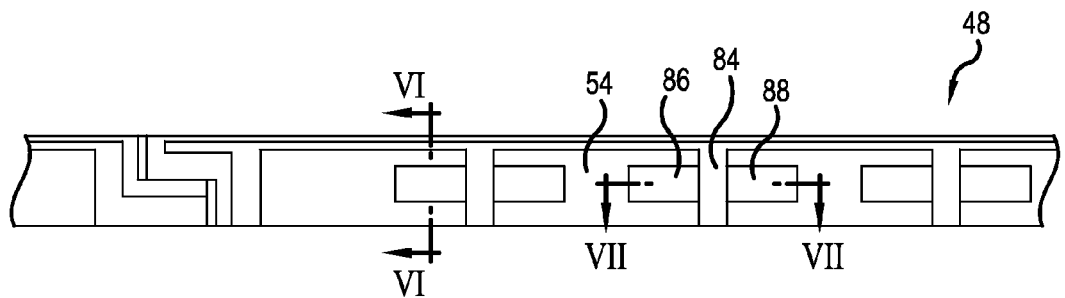
FIG.5
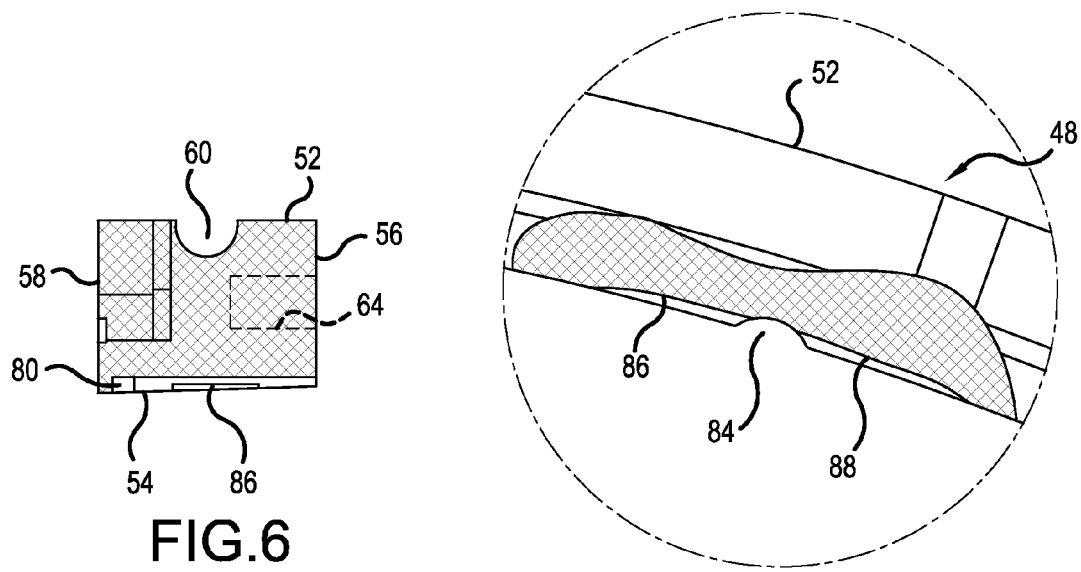
FIG.6
FIG.7
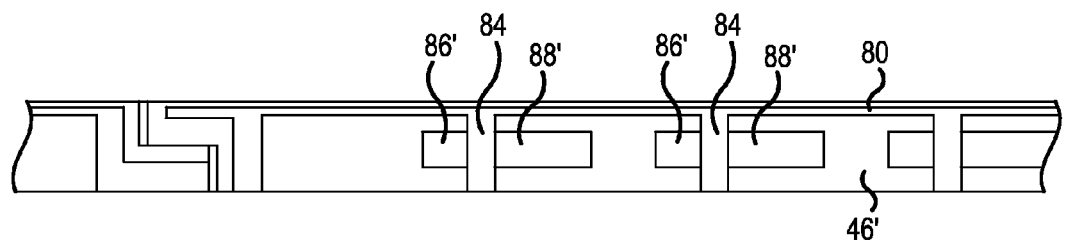
FIG.8

BIDIRECTIONAL LIFT-OFF CIRCUMFERENTIAL SHAFT SEAL SEGMENT AND A SHAFT SEAL INCLUDING A PLURALITY OF THE SEGMENTS

FIELD OF THE INVENTION

The present invention is directed toward a segment of a lift-off circumferential shaft seal and a lift-off circumferential shaft seal formed from a plurality of the segments which shaft seal is mountable to a rotatable sleeve, and, more specifically, toward a segment of a bidirectional lift-off circumferential shaft seal and a bidirectional lift-off circumferential shaft seal configured formed from a plurality of the segments which shaft seal is mountable to a rotatable sleeve and configured to maintain a gas film between the seal and the sleeve when the sleeve rotates in either of first and second opposite directions relative to the seal.

BACKGROUND OF THE INVENTION

Various devices are known for forming a seal between a rotatable shaft, or a sleeve mounted on a rotatable shaft, and a housing or other structure surrounding the shaft. One type of seal, sometimes referred to as a contact circumferential shaft seal, is very effective in controlling leakage. These seals include one or more seal rings with circumferential inner faces that contact the rotating sleeve and slide against the sleeve while it rotates. Such seals may be formed from compacted and sintered carbon graphite to provide heat and wear resistance, and they are often formed as a plurality of interconnectable ring segments to facilitate installation about the sleeve. The seal rings are held in place by a suitable retaining device and may include a biasing device, such as a circumferential or garter spring, for holding the seal segments together.

While carbon seal rings are durable and capable of withstanding high levels of heat and friction, sliding contact with a rotating sleeve eventually causes the rings to wear out. The rate at which the carbon rings wear is based in part on the relative speed of the sleeve and shaft, and in some high-efficiency jet engines, this speed, expressed as a linear velocity, can exceed 600 feet/second or about 400 miles/hour, for extended periods of time. The heat generated by contact at such speeds causes the seal rings to wear and require frequent maintenance and/or replacement. The desire for longer operating life and higher thermal efficiency has therefore moved the seal industry to look for alternatives to circumferential contact seals.

One alternative to circumferential contact seals is a circumferential gas film seal. Much like the circumferential contact seal, this seal includes one or more carbon seal rings that exert a very light contact force against the rotating sleeve when it is rotating or not rotating. The light contact force is achieved by routing high pressure gas to opposing faces through clearance spaces and milled cutouts. In the case of a contacting circumferential seal, the outer diameter of the ring is exposed across its entire width while the inside diameter is exposed across its entire width except for the width of a small sealing dam. This creates an imbalance in force that lightly seats the seal against the rotating sleeve. Producing a force balanced contact in this manner is referred to hydrostatic sealing, and a hydrostatic seal can be maintained both when the shaft is rotating and when the shaft is stationary. Alternately or in addition, hydrodynamic sealing can be produced by forming recesses or cutouts on the side of the seal ring that faces the sleeve. As the sleeve rotates, air entrained by the rotating sleeve is compressed in these cutouts, and as it escapes over the non-recessed "pads" between the recesses, it produces an additional pressure and flow of air for maintaining a separation between the seal ring and the sleeve. Circumferential gas film seals generate less friction and less heat than circumferential contact seals, and thus generally last longer, require less maintenance and experience less oil cooling efficiency loss than contact seals.

One shortcoming of known circumferential gas film seals is that they are directional. In other words, the configuration of the recesses that produce the gas film when the sleeve rotates in a desired direction relative to the sleeve are not effective when the sleeve rotates in the opposite direction. Rotation in the "wrong" direction can occur either when the seal ring is installed backwards on the sleeve or when the sleeve rotates in the wrong direction inside a properly installed seal ring. Rotation in the wrong direction can occur, for example, when a strong wind blows through a jet engine and rotates the shaft backwards, an event referred to as "windmilling."

When the sleeve rotates in the wrong direction relative to the seal, rather than lift the seal off the sleeve, the cutouts in the circumferential face may actually "suck" the seal toward the rotating sleeve and increase friction and the speed at which the seal ring wears. It would therefore be desirable to provide a bidirectional circumferential gas film seal that performs in a satisfactory manner independently of its mounting direction and/or when mounted on a rotatable sleeve that is intended to or at least capable of rotating in two directions.

SUMMARY OF THE INVENTION

These and other problems are addressed by embodiments of the present invention, a first aspect of which comprises a circumferential shaft seal segment having a radial outer face, a radially inner face, a first axial face extending from the radial outer face to the radial inner face, and a second axial face axially spaced from the first axial face and extending from the radially outer face to the radially inner face. The seal segment has a bleed slot in the radially inner face extending from the first axial face toward the second axial face and there are first and second recesses in the radially inner face in communication with the bleed slot that extend from the bleed slot in circumferentially opposite directions.

A further aspect of the invention comprises a circumferential shaft seal segment that has a radial outer face, a radially inner face, a first axial face extending from the radial outer face to the radial inner face and a second axial face axially spaced from the first axial face and extending from the radially outer face to the radially inner face. The seal segment also includes bidirectional lifting means for producing a gas film between the radially inner face and a sleeve rotating adjacent to the radially inner face when the sleeve rotates in a first direction and when the sleeve rotates in a second direction opposite the first direction.

Another aspect of the invention comprises a circumferential shaft seal segment having a radial outer face, a radially inner face, a first axial face extending from the radial outer face to the radial inner face and a second axial face axially spaced from the first axial face and extending from the radially outer face to the radially inner face. The shaft seal segment has an axial bleed slot in the radially inner face extending from the first axial face toward the second axial face, and there are first and second ramps extending from the axial bleed slot in opposite circumferential directions from the axial bleed slot. The first and second ramps are disposed between the first axial face and second axial face.

BRIEF DESCRIPTION OF THE DRAWINGS

These and other aspects and features of the present invention will be better understood after a reading of the following detailed description, together with the attached drawings.

FIG. 5 is a plan view of a portion of the circumferentially inner surface of the seal ring of FIG. 3.

FIG. 6 is a sectional elevational view taken along line VI-VI in FIG. 5.

FIG. 7 is a sectional elevational view taken along line VII-VII in FIG. 5.

FIG. 8 is a plan view of a portion of the circumferentially inner surface of an alternative seal ring for use in the seal of FIG. 1.

DETAILED DESCRIPTION

Figure 1:
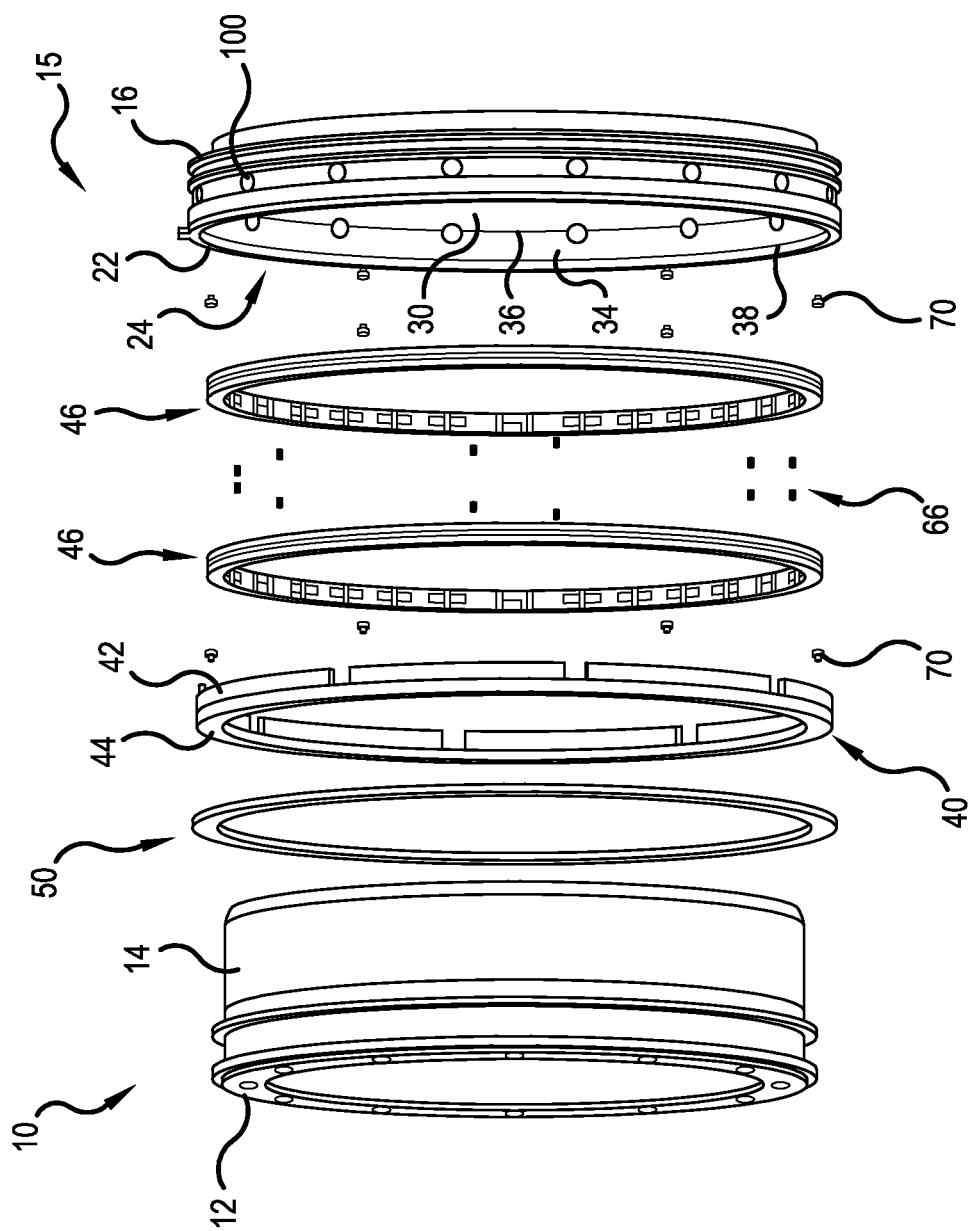
FIG. 1 is an exploded perspective view of a sealing system including a seal comprising segmented seal rings mounted on a rotatable sleeve according to an embodiment of the present invention.
Figure 2:
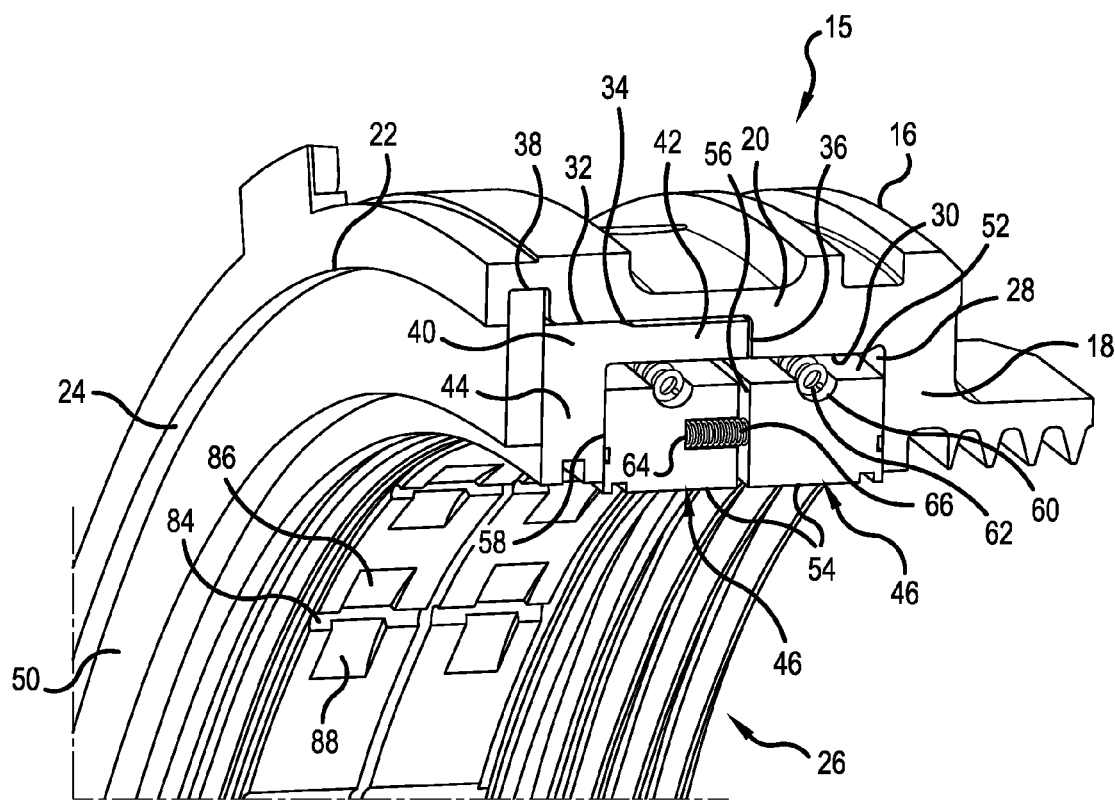
FIG. 2 is a sectional perspective view of the seal of FIG. 1.

Referring now to the drawings, wherein the showings are for purposes of illustrating presently preferred embodiments of the invention only and not for the purpose of limiting same, FIG. 1 is an exploded view of a sealing system 10 according to an embodiment of the present invention that includes a sleeve 12 having a circumferentially outer seal surface 14. The sleeve 12 is configured to be mounted on a rotatable shaft (not illustrated) so that the sleeve rotates with the shaft about the rotational axis of the shaft. The sealing system 10 further includes a seal assembly 15 that includes a seal housing 16. The seal housing 16 has a radially extending side wall 18 (FIG. 2) and a circumferential side wall 20 extending from the radial side wall 18, an edge 22 of the circumferential side wall 20 spaced from the radial side wall 18 defining an opening 24 into the interior 26 of the seal housing 16. The interior 26 has a first region 28 adjacent to the radial side wall 18 which first region 28 has a first diameter defined by a first inner side wall portion 30 and a second region 32 having a second diameter greater than the first diameter defined by a second inner side wall portion 34 which extends from a step 36 at an end of the first inner side wall portion 30 toward the opening 24. A circumferential groove 38 is formed in the interior of the second inner side wall 34 adjacent to the opening 24.

A cover plate 40, L-shaped in cross section, includes an axially extending first leg 42 that has a radial thickness approximately equal to the height of the step 36 between the first inner side wall portion 30 and the second inner side wall portion 34 and a radially extending second leg 44. The cover plate 40 is mounted in the opening 24 of the seal housing 16 with an end of the first leg 42 closely spaced from or pressing against the step 36. A space for retaining first and second seal rings 46 is defined on one side by the inner side of the first leg 42 and the first inner side wall 30 and has axially opposite sides at the second leg 44 of the cover plate 40 and at the radial side wall 18 of the seal housing 16. A retaining ring 50 mounts in the circumferential groove 38 in the seal housing 16 to hold the cover plate 40 in the seal housing 16. The sleeve 12 extends through the opening defined by the seal housing 16, the cover plate 40 and the seal rings 46, and when the sleeve 12 is not rotating, the seal rings 46 rests on the seal surface 14. Alternately, in some environments, the seal assembly 15 could be mounted directly on a rotatable shaft (not illustrated) without the use of a sleeve. The seal 15 will be referred to as a "shaft" seal whether or not a sleeve is used on the shaft.

Figure 3:
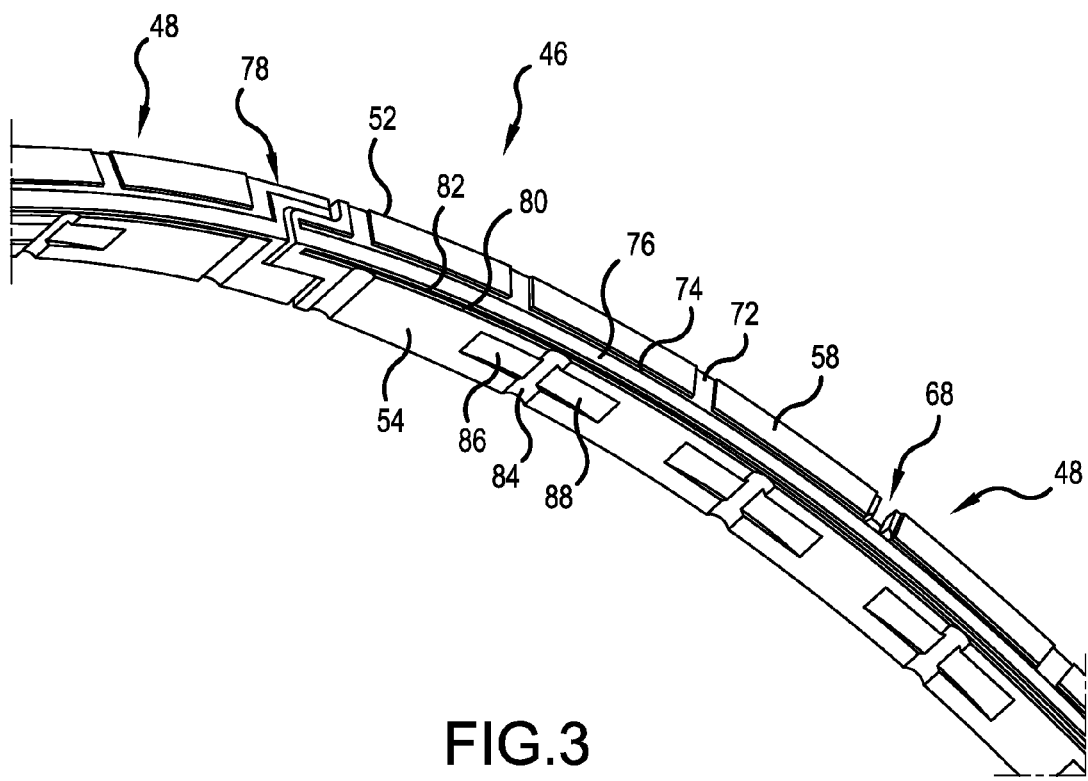
FIG. 3 is a perspective view of a portion of one of the seal rings of FIG. 1.

Each of the seal rings 46 is formed of a plurality of individual arc-shaped segments 48, six 60 degree segments, for example, suitably interconnected by joints described hereinafter. Two of the segments 48 and a joint therebetween can be seen, for example, in FIG. 3. The seal rings 46 are identical but are mounted on the sleeve 12 facing in opposite directions so that one of the seal rings 46 is a mirror image of the other. The following descriptions apply equally to each of the seal rings 46, but, when necessary to distinguish one seal ring from the other, the left-hand and right-hand seal rings will be discussed. This description is based on the relative locations of the seal rings 46 in the drawing figures and is provided for ease of description only and is not intended in any manner to limit the locations or orientations of the seal rings in use. In addition, the terms "axial," "radial" and "circumferential" may be used when describing individual seal segments 48, and these terms should be understood to refer to the same directions as they would when the segments 48 are assembled into a seal ring 46. That is, the outwardly curved side of a seal segment 48 may be referred to as an "outer circumferential side" of the seal segment 48 as if the seal segment 48 were part of a complete seal ring 46 having a circumference even when only one arc-shaped seal segment 48 is being discussed.

The seal rings 46 each have a radially outer surface 52, a radially inner surface 54, a first axial side surface 56 and a second axial side surface 58, and the seal rings 46 are mounted in the seal housing 16 with their first axial side surfaces 56 facing one another. The radially outer surface 52 of each seal segment 48 includes a circumferential groove 60, and a circumferential or "garter" spring 62 is mounted in the circumferential groove 60 to hold the seal segments 48 of the seal rings 46 together. The first axial side surfaces 56 of the pair of seal rings 46 each include a plurality of axial bores 64 which receive compression springs 66 for biasing the seal rings 46 away from one another and for pressing the second axial side surface 58 of the left-hand seal ring 46 against the cover plate 40 and pressing the second axial side surface 58 of the right-had seal ring 46 against the radial side wall 18 of the seal housing 16. The radially outer surfaces 52 of the seal rings 46 also include antirotation slots 68 for receiving antirotation pins 70 which engage with corresponding slots (not illustrated) in the seal housing 16 and in the cover plate 40 to secure the seal rings 46 against rotation inside the seal housing. The second axial side surface 58 of each seal segment 48 also includes a plurality of radial grooves 72 extending from the radially outer surface 52 to a circumferential groove 74 spaced from the radially inner surface 54 by a side seal dam 76. Each seal segment 48 includes an end joint geometry 78 configured to mate and/or interlock with the end joint geometry 78 of an adjacent seal segment 48 in a seal ring 46.

Figure 4:
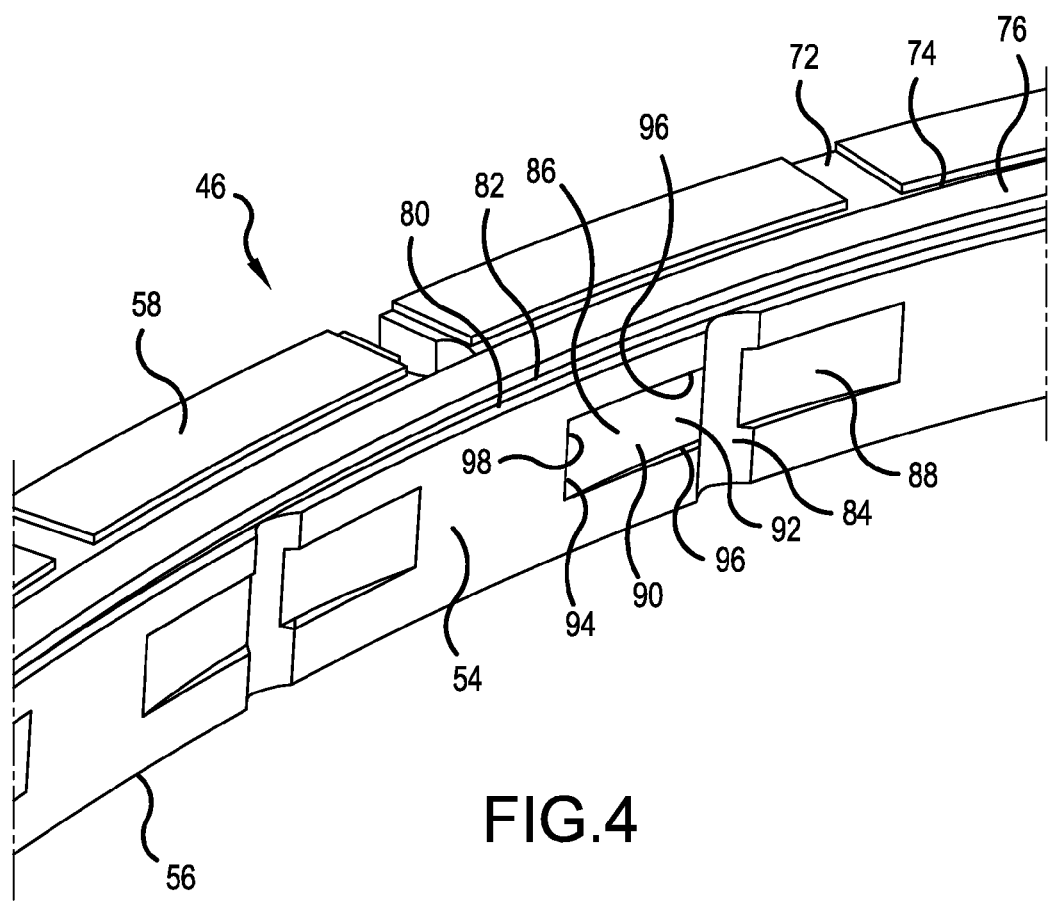
FIG. 4 is a perspective view of the circumferentially inner surface of the seal ring of FIG. 3.

With particular reference to FIG. 4, the radially inner surface 54 of each seal segment 48 includes a circumferential groove 80 spaced axially inwardly from the second axial side surface 58 by a bore seal dam 82. These circumferential grooves 80 extend from a location near one circumferential end of the seal segment 48 to a point near the other circumferential end, but they do not reach the ends of the seal segment 48 and do not communicate directly with the circumferential grooves 80 of adjacent seal segments 48. A plurality of bleed slots 84 extend axially across the radially inner surface 54 of the seal segments 48 from the first axial side surface 56 to the circumferential groove 80, and the bleed slots are distributed approximately evenly along the length of each seal segment at a suitable spacing, such as every 10 degrees, for example. The bleed slots 84 have a cylindrical inner surface and have a substantially constant depth as they extend axially across the radially inner surface 54 to the circumferential groove 80.

Each of the bleed slots 84 has an associated first recess 86 and a second recess 88, illustrated in FIGS. 4 and 5, that extend in circumferentially opposite directions therefrom. In this embodiment, the first and second recesses 86, 88 are identical and therefore only the first recess 86 will be described. The first recess 86 comprises a ramp 90 that extends circumferentially from a first end 92 at the bleed slot 84 toward a second end 94 circumferentially spaced from the bleed slot 84. First and second axially spaced side walls 96 extend from either axial side of the ramp 90 to the radially inner surface 54 of the seal ring 46, and an end wall 98 connects the axially spaced side walls 96 at the second end 94 of the first recess 86. The depth of the first recess 86 decreases monotonically from the first end 92 at the bleed slot 84 to the second end 94 thereof and has a first depth at its first end 92 and a second depth at its second end 94 which is less than the first depth. The axial width of the first recess 86 between the first and second axial side walls 96 may be, for example, approximately half of the axial width of the seal ring 46 between the first axial side surface 56 and the second axial side surface 58.

The seal rings 46 have a slight conical bore taper (axial taper) to accommodate rotating sleeve distortion at operating temperature and speed. This taper is illustrated in a greatly exaggerated manner in FIG. 6; the taper would not be visible in FIG. 6 if drawn to scale. The first and second recesses 86, 88 are much deeper (for example, about 0.014 in. at their first ends 92 and zero or close to zero at their second ends 94) than the radial bore taper (about a 0.00025 in. difference in diameter axially across the bore). The relative difference in size between the ramp depth and the bore taper are mutually compatible from both a machining and functionality standpoint. Both the benefits of the lift geometry and legacy bore taper can be maintained on the typical circumferential seal design. A conventional lift ramp recess, on the other hand, may be on the order of 0.00050 inch deep and would be difficult to machine in conjunction with the legacy bore taper dimensions.

The operation of the seal system 10 will now be described. To begin operation, a plenum between the radially outer surfaces 52 of the seal rings 46 and the inside of the seal housing 16 is pressurized by supplying pressured air or other gas through buffer air holes 100 in the seal housing 16. This air flows between the facing first axial side surfaces 56 of the two seal rings 46 and through the axial bleed slots 84 to the circumferential grooves 80 in the radially inner surface 54 of each of the seal segments 48. This air under pressure is forced between the bore seal dam 82 and the sleeve 12 and contributes to the force balancing between the seal segments 46 and the sleeve 12. The pressurized air from the plenum also flows through the radial grooves 72 in the second axial side surfaces 58 of the seal rings 46 to the circumferential grooves 74 in the second axial side surfaces 58 and is forced under pressure between the side seal dam 76 of the left-hand seal 46 and the cover plate 40 and between the side seal dam 76 of the right-hand seal 46 and the radial sidewall 18 of the seal housing 16 to further contribute to the force balancing between the seal segments 46 and the sleeve 12. After passing around the seal segments 46, the escaping air travels in opposite directions over the outer seal surface 14 of the sleeve 12. This hydrostatic balancing reduces the contact force between the seal rings 46 and the sleeve 12.

As the sleeve 12 rotates inside the seal rings 46, the air or gas used to pressurize the plenum outside the seal rings 46 is entrained by the rotating shaft and compressed in the first recesses 86 of one of the seal rings 46 and in the second recesses 88 of the other one of the seal rings 46. The compressed air escapes past the end wall 98 and over the side walls 96 of the first and second recesses 86, 88 and flows over the radially inner surface 54 of the seal rings 46. This additional air flow provides a dynamic gas seal and helps maintain a gas film and hence a separation between the seal rings 46 and the rotating sleeve 12. A robust form of hydrodynamic lift geometry is imperative in man-rated flight engines. The reliance on a single form of wear abatement is a high risk at the operating speeds and pressures of these engines, and the use of hydrostatic and hydrodynamic sealing increases the reliability of the seal system 10.

As discussed above, the seal system 10 of the present embodiment comprises two seal rings 46 mounted such that they face in in opposite directions. By providing both first and second recesses 86, 88, extending in circumferentially opposite directions from the axial bleed sots 84, identical parts can be used for both seal rings 46, even though they are mounted in opposite directions on the sleeve 12. This reduces the number of parts that must be maintained in inventory and eliminates the possibility of the wrong seal ring 46 being installed. The seal rings 46 must still be installed in the proper orientation, that is, with the first axial sides 56 facing each other, but because the parts are identical, the odds of selecting and installing an improper seal ring are reduced. When the sleeve 12 rotates inside the seal rings 46, air entrained by the rotating sleeve 12 will be forced into the first recesses 86 of one of the seal rings 46 and into the second recesses 88 of the other seal ring and thus provide dynamic lift.

Furthermore, it is sometimes possible for a shaft and sleeve to rotate in a direction opposite to an intended direction. For example, when the seal system 15 is used in a jet engine, a strong wind may blow through an engine of a parked airplane and cause the engine vanes to spin. This action may be referred to as "windmilling" and may cause problems when uni-directional seal elements are used. When oppositely extending recesses 86 and 88 are not present, this opposite direction rotation may cause a conventional seal ring to be attracted to the sleeve, and thus a convention "lift off" ring may become a "suck down" ring and damage the seal ring. The seal rings 46 according to this embodiment tend to lift the seal ring 46 from the sleeve 12 regardless of which direction the sleeve 12 is rotating and thus avoid the problems that may have been caused by engine windmilling in the past. Such seal rings 46 may also be useful in other environments where a seal is required for a sleeve that is intended to rotate in two different directions.

An alternative configuration for a seal ring 46' usable in the seal system 10 described above is illustrated in FIG. 8. In this embodiment, elements common to the first embodiment are identified with like reference numerals and modified versions of elements of the first embodiment are identified using the same reference numeral and a prime. In this embodiment, the a first recess 86' and a second recess 88' are provided on circumferentially opposite sides of the bleed slot 84. However, in this embodiment, the first and second recesses 86', 88' are not identical, but rather, the first recess 86' is smaller, that is, shorter in a circumferential direction, that the second recess 88'. The seal ring 46 that faces the oil-containing side of the sleeve, the right side in FIG. 8 and the seal ring 46 that faces the air side of the seal may have different lift requirements, and the length of the respective recess can be selected accordingly. Specifically, the seal ring 46' on the air side of the seal system 10 should use the longer recess 88' to produce lift and the seal ring 46' on the oil side of the seal will use the shorter recess 86' to produce lift. This is because the amount of lift generated by the ramps is a function of the entrained gas or fluid. The oil side seal may develop an oil film on the bore surface and cause additional hydrodynamic lift clearance. A shorter recess will help to reduce this clearance. Alternately or in addition, one could increase the length of a recess to increase clearance and reduce wear on the seal ring predicted to show the most wear (usually air side).

The present invention has been described herein in terms of presently preferred embodiments. However, modifications and additions to these embodiments will become apparent to persons of ordinary skill in the relevant art upon a reading of the foregoing description. It is intended that all such modifications comprise part of the present invention to the extent they fall within the scope of the several claims appended hereto.

We claim:

1. A circumferential shaft seal segment for sealing about a rotatable shaft, the seal segment comprising:
   a radial outer face;
   a radially inner face;
   a first axial face extending from the radial outer face to the radial inner face; and
   a second axial face axially spaced from the first axial face and extending from the radially outer face to the radially inner face,
   a bleed slot in the radially inner face extending from the first axial face toward the second axial face; and
   first and second recesses in the radially inner face in communication with the bleed slot and extending from the bleed slot in opposite circumferential directions, each recess including first and second parallel, radially and circumferentially extending side walls and a ramped surface connecting the first and second side walls and facing generally toward the bleed slot and toward the other ramped surface such that the first recess is configured to generate lift when the shaft rotates in a first direction and the second recess is configured to generate lift when the shaft rotates in a second, opposing direction.

2. The circumferential shaft seal segment of claim 1, wherein the bleed slot has a first end at the first axial face and a second end and comprises a liner channel extending from the first end to the second end.

3. The circumferential shaft seal segment of claim 1, wherein the first recess has a first end at the bleed slot and a second end circumferentially spaced from the bleed slot, and a first depth at the first end and a second depth at the second end, and wherein the first depth is greater than the second depth.

4. The circumferential shaft seal segment of claim 3, wherein the second recess has a first end at the bleed slot and a second end circumferentially spaced from the bleed slot, and a first depth at the first end of the second recess and a second depth at the second end of the second recess, and wherein the first depth of the second recess is greater than the second depth of the second recess.

5. The circumferential shaft seal segment according to claim 4, wherein the radially inner face includes a circumferential channel axially inward of the second axial face, the circumferential channel having a circumferential centerline closer to the second axial face than to the first axial face, wherein the bleed slot extends from the first axial face to the circumferential channel, wherein the bleed slot has a first end at the first axial face and a second end at the circumferential channel, and wherein the first and second side walls meet the bleed slot at a location axially spaced from the first axial face and axially spaced from the circumferential channel.

6. The circumferential shaft seal segment of claim 4, wherein the depth of the first recess increases monotonically from the bleed slot to the second end of the first recess and wherein the depth of the second recess increases monotonically from the bleed slot to the second end of the second recess.

7. The circumferential shaft seal segment of claim 4, wherein the first recess comprises a ramp from the bleed slot to the second end of the first recess, the ramp being bounded by the first and second side walls, each of the side walls being spaced axially inwardly from the first bleed slot end and second bleed slot end.

8. The circumferential shaft seal segment according to claim 4, wherein a circumferential length of the first recess from the bleed slot to the second end of the first recess is equal to a circumferential length of the second recess from the bleed slot to the second end of the second recess.

9. A circumferential shaft seal segment for sealing about a rotatable shaft, the seal segment comprising:
   a radial outer face;
   a radially inner face;
   a first axial face extending from the radial outer face to the radial inner face; and
   a second axial face axially spaced from the first axial face and extending from the radially outer face to the radially inner face,
   a bleed slot in the radially inner face extending from the first axial face toward the second axial face; and
   first and second recesses in the radially inner face in communication with the bleed slot and extending from the bleed slot in opposite circumferential directions, each recess including a ramped surface facing generally toward the bleed slot and toward the other ramped surface such that the first recess is configured to generate lift when the shaft rotates in a first direction and the second recess is configured to generate lift when the shaft rotates in a second, opposing direction,
   wherein the first recess has a first end at the bleed slot and a second end circumferentially spaced from the bleed slot, and a first depth at the first end and a second depth at the second end, and wherein the first depth is greater than the second depth,
   wherein the second recess has a first end at the bleed slot and a second end circumferentially spaced from the bleed slot, and a first depth at the first end of the second recess and a second depth at the second end of the second recess, and wherein the first depth of the second recess is greater than the second depth of the second recess, and
   wherein a circumferential length of the first recess from the bleed slot to the second end of the first recess is less than a circumferential length of the second recess from the bleed slot to the second end of the second recess.

10. A circumferential shaft seal segment for sealing about a rotatable shaft, the seal segment comprising:
a radial outer face;
a radially inner face;
a first axial face extending from the radial outer face to the radial inner face; and
a second axial face axially spaced from the first axial face and extending from the radially outer face to the radially inner face,
a bleed slot in the radially inner face extending from the first axial face toward the second axial face; and
first and second recesses in the radially inner face in communication with the bleed slot and extending from the bleed slot in opposite circumferential directions, each recess including a ramped surface facing generally toward the bleed slot and toward the other ramped surface such that the first recess is configured to generate lift when the shaft rotates in a first direction and the second recess is configured to generate lift when the shaft rotates in a second, opposing direction wherein the bleed slot has a first end at the first axial face and a second end and comprises a liner channel extending from the first end to the second end,
wherein the first recess has a depth at the bleed slot, the first recess depth increasing in a direction from the first axial face toward the second axial face.

11. The circumferential shaft seal segment of claim 1, wherein the bleed slot is axially disposed in the radially inner face and wherein the first recess and the second recess are symmetric about a center line of the bleed slot.

12. The circumferential shaft seal segment of claim 11, wherein the radially inner face includes a circumferential channel axially inward of the second axial face, and wherein the bleed slot extends from the first axial face to the circumferential channel.

13. A circumferential shaft seal comprising a plurality of the circumferential shaft seal segments of claim 1.

14. A circumferential shaft seal comprising a first seal ring and a second seal ring mounted axially adjacent to the first seal ring in a housing, each of the first and second seal rings being formed from a plurality of the circumferential shaft seal segments of claim 1, the circumferential shaft seal segments being mounted in the housing with the first axial faces of the circumferential shaft seal segments of the first seal ring facing the first axial faces of the circumferential shaft seal segments of the second seal ring.

15. A circumferential shaft seal comprising a seal ring mounted in a housing, the seal ring being formed from a plurality of the circumferential shaft seal segments of claim 1.

16. The circumferential shaft seal according to claim 9, wherein the first recess and the second recess each have first and second parallel, radially and circumferentially extending side walls, the ramped surface connecting the first and second side walls.

17. The circumferential shaft seal according to claim 10, wherein the first recess and the second recess each have first and second parallel, radially and circumferentially extending side walls, the ramped surface connecting the first and second side walls.

* * * * *